(12) United States Patent
Wheatley, III et al.

(10) Patent No.: US 9,479,225 B2
(45) Date of Patent: Oct. 25, 2016

(54) RESONANCE DETECTION AND CONTROL WITHIN A WIRELESS POWER SYSTEM

(75) Inventors: Charles E Wheatley, III, San Diego, CA (US); Zhen Ning Low, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 12/944,211

(22) Filed: Nov. 11, 2010

(65) Prior Publication Data

US 2011/0278945 A1 Nov. 17, 2011

Related U.S. Application Data

(60) Provisional application No. 61/334,523, filed on May 13, 2010.

(51) Int. Cl.
| | |
|---|---|
| *H04B 5/00* | (2006.01) |
| *H02J 17/00* | (2006.01) |
| *H02J 7/02* | (2016.01) |

(52) U.S. Cl.
CPC ............. *H04B 5/0037* (2013.01); *H02J 17/00* (2013.01); *H04B 5/00* (2013.01); *H02J 7/025* (2013.01); *H04B 5/0081* (2013.01)

(58) Field of Classification Search
USPC ........................................................ 307/104
See application file for complete search history.

(56) References Cited

U.S. PATENT DOCUMENTS

| | | | |
|---|---|---|---|
| 5,701,121 A | 12/1997 | Murdoch | |
| 7,574,173 B2 * | 8/2009 | Terranova et al. | 455/41.1 |
| 8,064,825 B2 * | 11/2011 | Onishi et al. | 455/41.1 |
| 8,130,159 B2 * | 3/2012 | Wuidart et al. | 343/749 |
| 8,270,925 B2 * | 9/2012 | Behzad et al. | 455/277.1 |
| 8,294,300 B2 * | 10/2012 | Cook et al. | 307/104 |
| 8,934,857 B2 * | 1/2015 | Low | H02J 7/025 307/104 |
| 9,337,666 B2 * | 5/2016 | Low | H02J 7/025 |
| 2005/0219132 A1 * | 10/2005 | Charrat | 343/745 |
| 2007/0109819 A1 | 5/2007 | Powell | |
| 2009/0079268 A1 * | 3/2009 | Cook et al. | 307/104 |
| 2009/0096413 A1 * | 4/2009 | Partovi et al. | 320/108 |
| 2009/0134712 A1 * | 5/2009 | Cook et al. | 307/104 |
| 2009/0243397 A1 | 10/2009 | Cook et al. | |
| 2009/0284082 A1 | 11/2009 | Mohammadian | |
| 2009/0284220 A1 * | 11/2009 | Toncich et al. | 320/108 |
| 2010/0039337 A1 * | 2/2010 | Wuidart et al. | 343/745 |

(Continued)

FOREIGN PATENT DOCUMENTS

| | | |
|---|---|---|
| CN | 101667754 A | 3/2010 |
| EP | 1022677 A1 | 7/2000 |

(Continued)

OTHER PUBLICATIONS

International Search Report and Written Opinion—PCT/US2011/036410, ISA/EPO—Aug. 5, 2011.

*Primary Examiner* — Adi Amrany
(74) *Attorney, Agent, or Firm* — Knobbe Martens Olson & Bear LLP

(57) ABSTRACT

Exemplary embodiments are directed to resonant frequency tuning. A device includes a transmit coil for transmitting wireless power. The device further includes a transmit element configured to selectively modify a resonant frequency of the transmitter by at least one of inserting the transmit element into the transmit coil or inductively coupling the transmit element to the transmit coil.

33 Claims, 12 Drawing Sheets

(56) References Cited

U.S. PATENT DOCUMENTS

| | | | |
|---|---|---|---|
| 2010/0052431 A1* | 3/2010 | Mita | 307/104 |
| 2010/0127660 A1* | 5/2010 | Cook et al. | 320/108 |
| 2010/0148939 A1* | 6/2010 | Yamada et al. | 340/10.34 |
| 2010/0164295 A1* | 7/2010 | Ichikawa et al. | 307/104 |
| 2010/0187913 A1* | 7/2010 | Smith et al. | 307/104 |
| 2010/0244580 A1* | 9/2010 | Uchida et al. | 307/104 |
| 2010/0277120 A1* | 11/2010 | Cook et al. | 320/108 |
| 2011/0133569 A1* | 6/2011 | Cheon et al. | 307/104 |
| 2011/0234011 A1 | 9/2011 | Yi et al. | |
| 2011/0241437 A1 | 10/2011 | Kanno | |
| 2011/0241750 A1* | 10/2011 | Hill | 327/306 |
| 2011/0266878 A9* | 11/2011 | Cook et al. | 307/104 |
| 2011/0266882 A1 | 11/2011 | Yamamoto et al. | |
| 2012/0038220 A1 | 2/2012 | Kim et al. | |
| 2012/0049642 A1 | 3/2012 | Kim et al. | |
| 2012/0080957 A1* | 4/2012 | Cooper et al. | 307/104 |
| 2012/0153739 A1* | 6/2012 | Cooper et al. | 307/104 |
| 2012/0242447 A1* | 9/2012 | Ichikawa | 336/84 C |

FOREIGN PATENT DOCUMENTS

| | | |
|---|---|---|
| EP | 1998343 A2 | 12/2008 |
| JP | H10187916 A | 7/1998 |
| JP | 2005210800 A | 8/2005 |
| JP | 2006146539 A | 6/2006 |
| JP | 2008295274 A | 12/2008 |
| JP | 2009543442 A | 12/2009 |
| WO | WO-2008002305 A1 | 1/2008 |
| WO | WO 2010014634 A2 | 2/2010 |

* cited by examiner

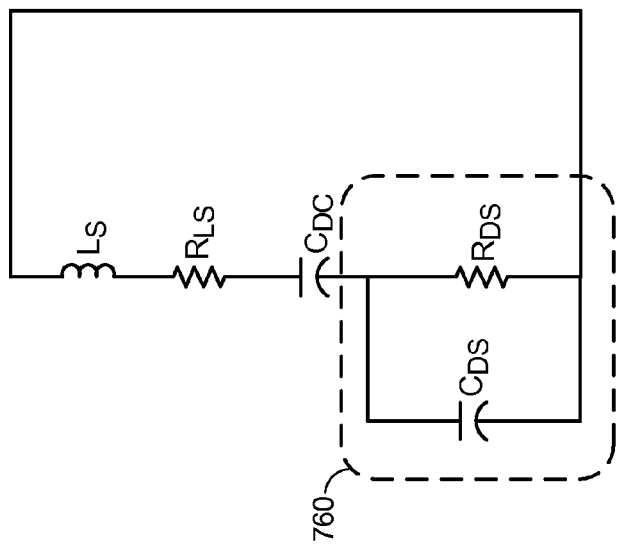
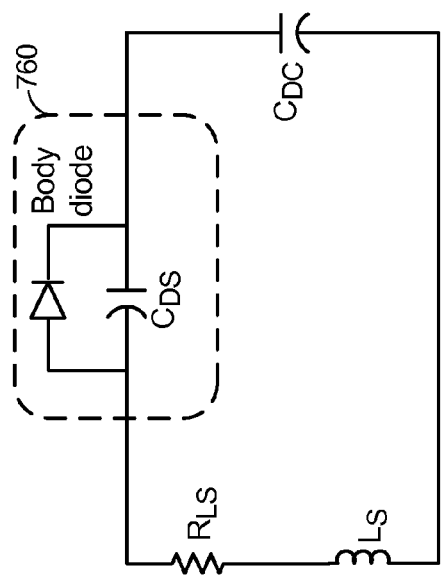
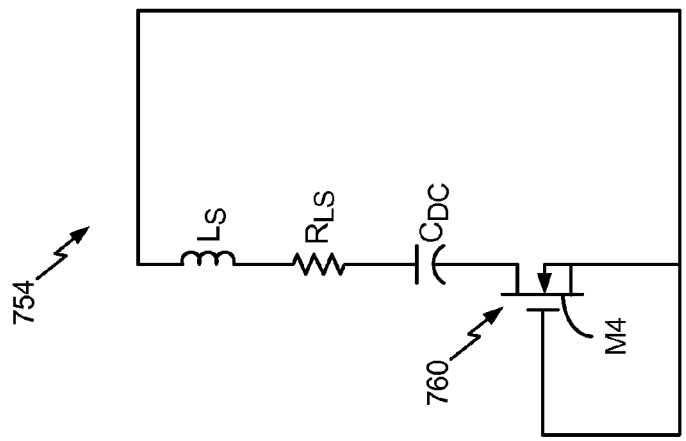
*FIG. 11A*
*FIG. 11B*
*FIG. 11C*

RESONANCE DETECTION AND CONTROL WITHIN A WIRELESS POWER SYSTEM

CLAIM OF PRIORITY UNDER 35 U.S.C. §119

This application claims priority under 35 U.S.C. §119(e) to:
U.S. Provisional Patent Application 61/334,523 entitled "RESONANCE DETECTION AND CONTROL" filed on May 13, 2010, the disclosure of which is hereby incorporated by reference in its entirety.

BACKGROUND

1. Field

The present invention relates generally to wireless power, and more specifically, to systems, device, and methods related to sensing and controlling a resonance condition of a wireless power system.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, the presence of metal objects and/or the presence of a different number of receivers proximate a transmitter may detune the transmitter. A wireless power system having a transmitter and a receiver that are not in a resonant match, may suffer from poor efficiency, which may generate thermal issues and may increase required charging times.

A need exists for methods, systems, and devices to enhance wireless power transfer. More specifically, a need exists for methods, systems, and devices for enabling a transmitter and a receiver within wireless power system to remain in resonant match.

BRIEF DESCRIPTION OF THE DRAWINGS

FIG. 11A is an illustration of another implementation of the transmitter of FIG. 10, according to an exemplary embodiment of the present invention.

FIG. 11B is an illustration of the implementation of the transmitter of FIG. 11A in one configuration, according to an exemplary embodiment of the present invention.

FIG. 11C is an illustration of the implementation of the transmitter of FIG. 11A in another configuration, according to an exemplary embodiment of the present invention.

DETAILED DESCRIPTION

The detailed description set forth below in connection with the appended drawings is intended as a description of exemplary embodiments of the present invention and is not intended to represent the only embodiments in which the present invention can be practiced. The term "exemplary"

used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors.

Figure 1:
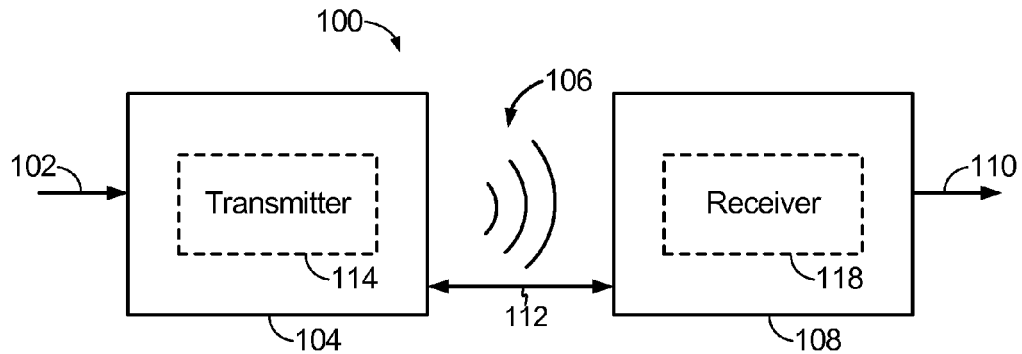
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a field 106 for providing energy transfer. A receiver 108 couples to the field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
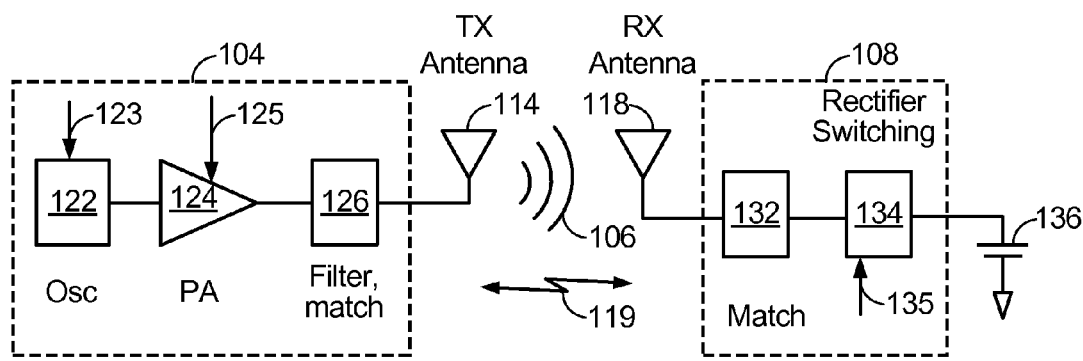
FIG. 2 shows a simplified schematic diagram of a wireless power transfer system.

FIG. 2 shows a simplified schematic diagram of a wireless power transfer system.

The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
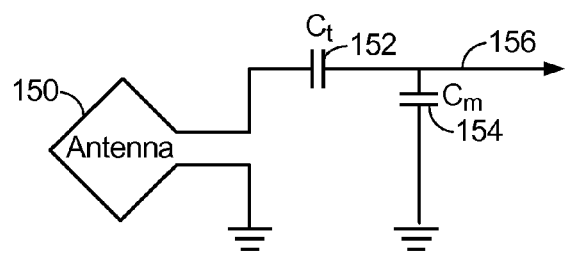
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
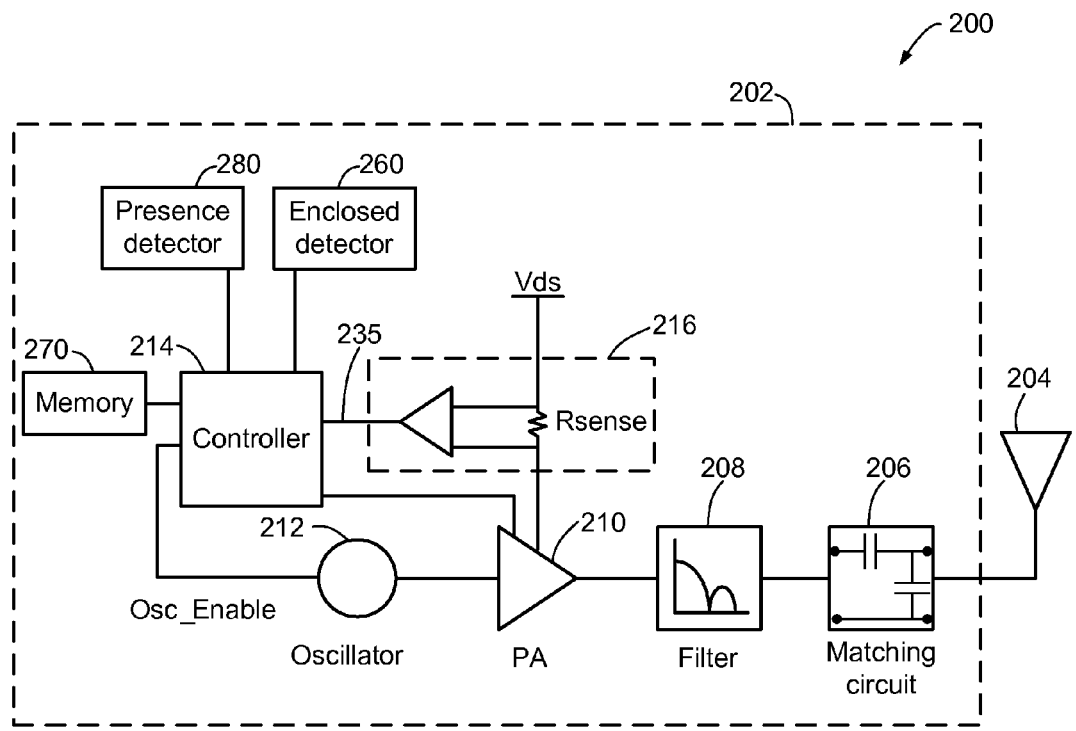
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at 468.75 KHz, or the ISM bands 6.78 Mhz or 13.56 Mhz.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
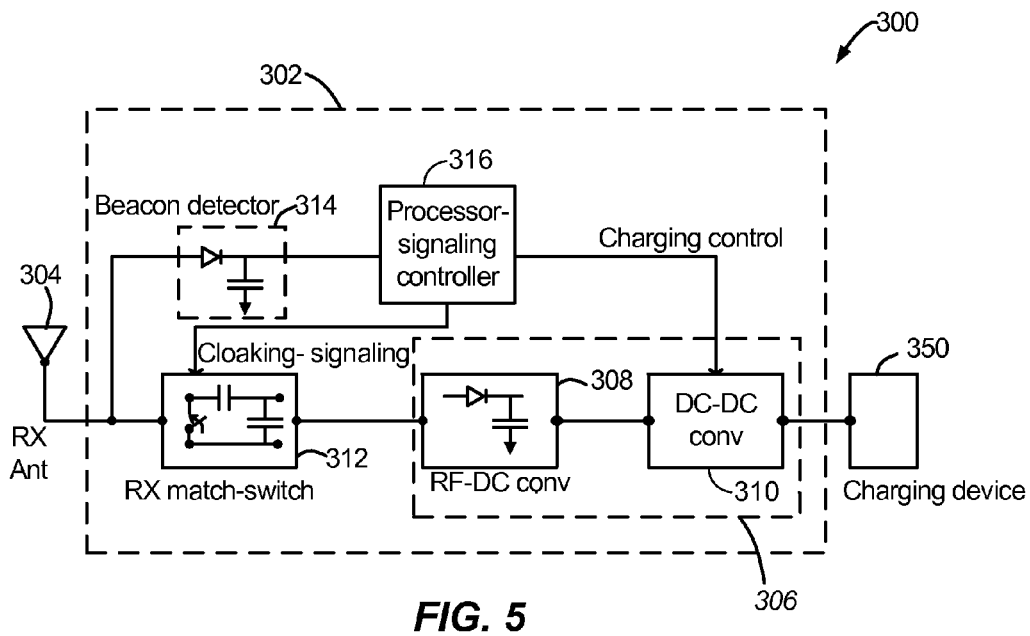
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the interwinding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Various exemplary embodiments of the present invention, as described herein, relate to systems, devices, and methods for tuning a resonant frequency of a transmitter. According to one exemplary embodiment, a transmitter may be configured to selectively include one or more reactive elements for tuning a resonant frequency of the transmitter to a desired frequency. Furthermore, according to another exemplary embodiment, a transmitter may inductively couple with one or more parasitic coils within the transmitter for tuning a resonant frequency of the transmitter to a desired frequency. According to yet another exemplary embodiment, a transmitter may couple with one or more parasitic coils, wherein the one or more parasitic coils may include one or more reactive elements, for tuning a resonant frequency of the transmitter to a desired frequency. Additionally, in accordance with another exemplary embodiment, a DC current of a power amplifier of a transmitter may be used to sense a resonant frequency condition of a wireless power system.

Figure 6:
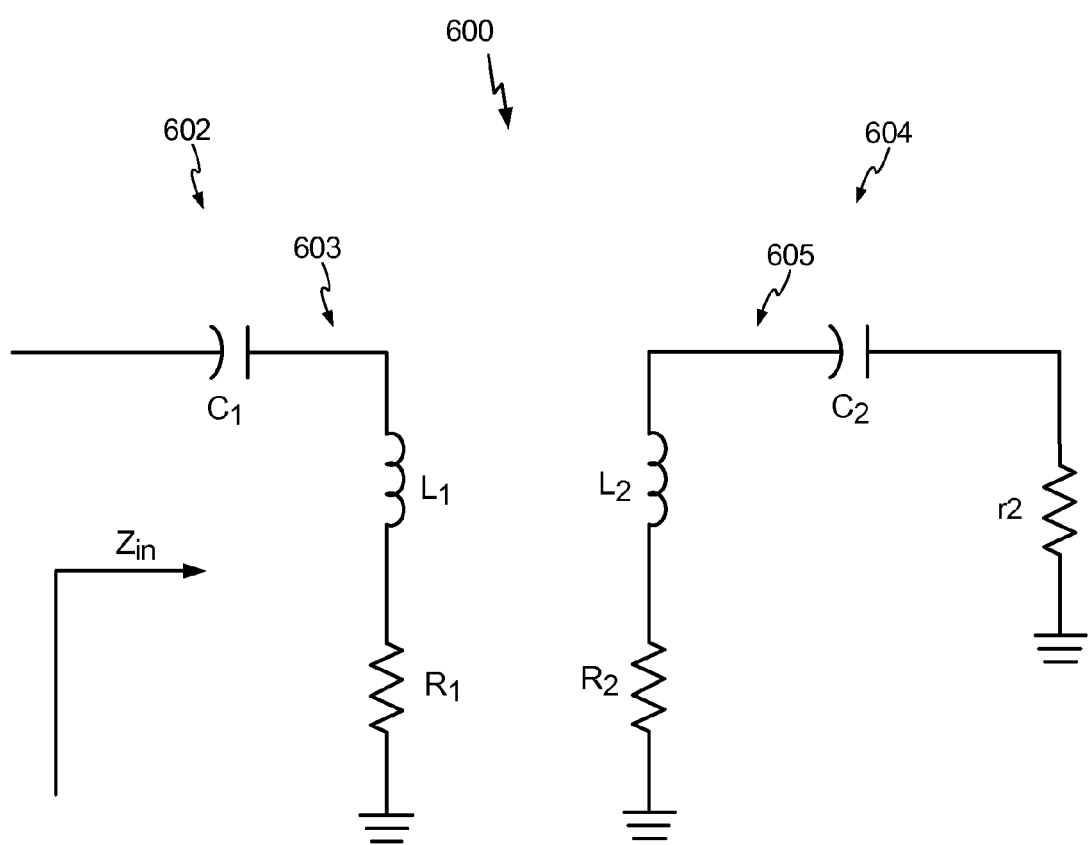
FIG. 6 illustrates a circuit diagram of a conventional wireless power system including a transmitter and a receiver.

FIG. 6 illustrates a circuit diagram of a conventional wireless power system 600 including a transmitter 602 and a receiver 604. Transmitter 600 includes a transmitting coil 603 having an inductor L1. A resistor R1 represents a parasitic resistance of transmitting coil 603. Further, a capacitor C1 may comprise a matching capacitor. By way of example only, transmitting coil 603 may be modeled as an ideal inductor L1 and parasitic resistance R1. Moreover, capacitor C1 may be used to tune transmitting coil 03 for resonance matching purposes. By way of example only, capacitor C1 may comprise a capacitance of 27.8 pF, inductor L1 may have an inductance of 5 μH, and resistor R1 may have a resistance of 5 ohms. Receiver 604 includes a receiving coil 605 having an inductor L2 and a parasitic resistance (i.e., resistor R2). Receiving coil 605 may be tuned by a capacitor C2 and may be coupled to a load, which is represented by resistor r2. By way of example only, capacitor C2 may comprise a capacitance of 27.8 pF, inductor L2 may have an inductance of 5 μH, resistor R2 may have a resistance of 5 ohms, and the frequency of transmitter 600 may comprise 13.56 MHz. As will be appreciated by a person having ordinary skill in the art, at resonance:

$$jwL_1 = 1/(jwC_1); \qquad (1)$$

Moreover, the impedance ($Z_{in}$) looking into the transmitting coil 603 may be given by the following equation:

$$Z_{in} = (Mw_0)^2/(R_2 + r_2); \qquad (2)$$

wherein M is the mutual inductance between transmitting coil 603 and receiving coil 605, $w_0$ is the frequency in radians, and $r_2$ is the load of receiver 604.

Figure 7:
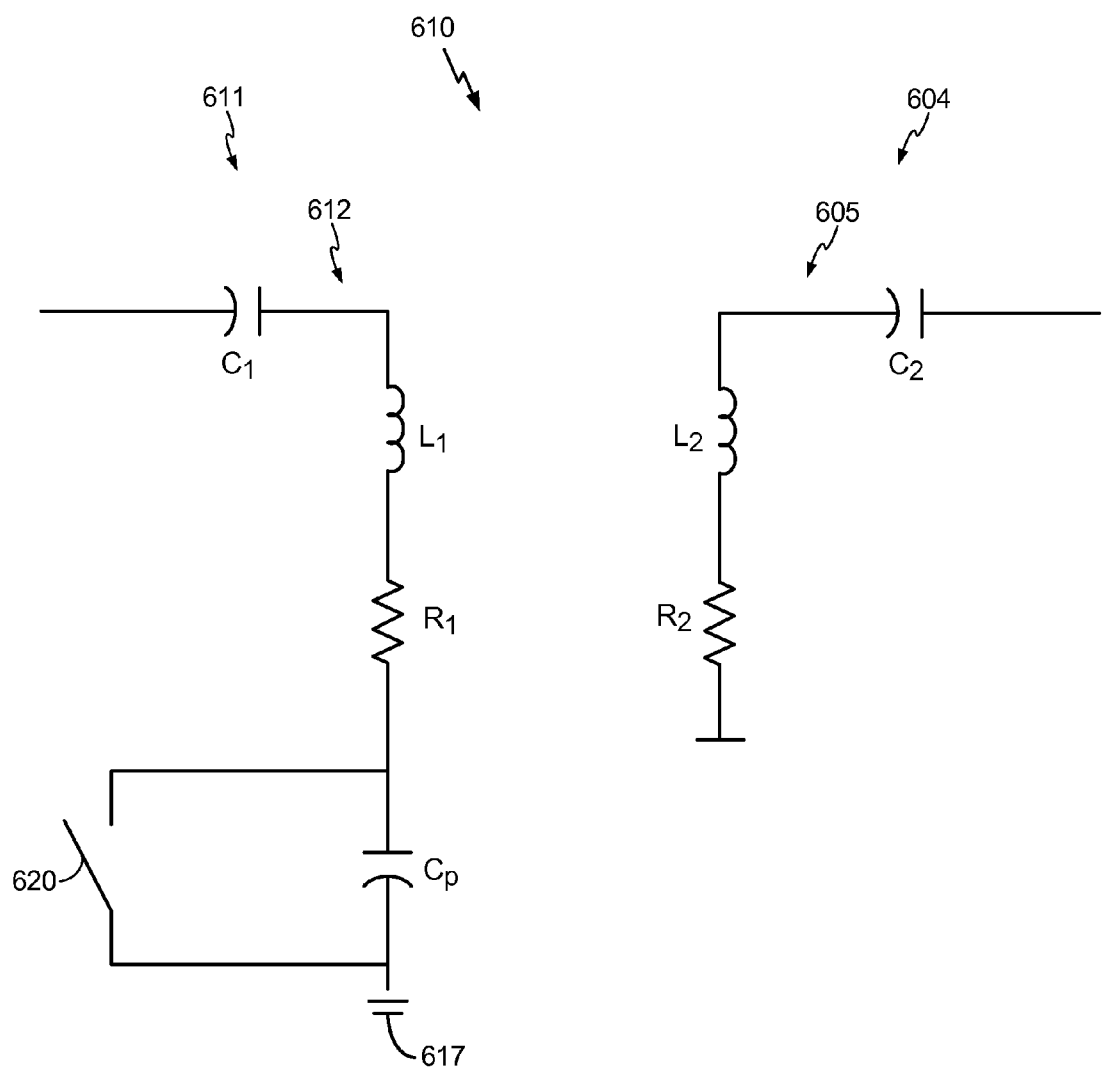
FIG. 7 illustrates a circuit diagram of a wireless power system including a transmitter and a receiver, according to an exemplary embodiment of the present invention.

FIG. 7 illustrates a circuit diagram of a wireless power system 610, in accordance with an exemplary embodiment of the present invention. Wireless power system 610 includes receiver 604 having receiving coil 605 including an inductor L2 and a resistance R2. Receiving coil may be tuned by a capacitor C2. By way of example only, capacitor C2 may comprise a capacitance of 27.8 pF, inductor L2 may have an inductance of 5 μH, and resistor R2 may have a resistance of 5 ohms. Wireless power system 610 also includes a transmitter 611 having a transmitting coil 612. Transmitting coil 612 includes inductor L1 and resistor R1, and may be tuned by capacitor C1. By way of example only, capacitor C1 may comprise a capacitance of 27.8 pF, inductor L1 may have an inductance of 5 µH, and resistor R1 may have a resistance of 5 ohms. Furthermore, transmitting coil 612 includes a reactive element (i.e., a capacitor Cp) having one side coupled to resistor R1 and another side coupled to a ground voltage 617. Moreover, reactive element Cp is in parallel with a switch 620. It is noted that the term "switch" may comprise any suitable and known switching element. While switch 620 is closed, the impedance ($Z_{in}$) looking into the transmitting coil may be given by the following equation:

$$Z_{in} = R_1 + (Mw_0)^2/(R_2 + r_2); \quad (3)$$

wherein M is the mutual inductance between transmitting coil 612 and receiving coil 605, $w_0$ is the frequency in radians, and $r_2$ is the load of receiver 604.

While switch 620 is open, the impedance ($Z_{in}$) looking into the transmitting coil may be given by the following equation:

$$Z_{in} = Z_{ino} + 1/(jwC_p); \quad (4)$$

wherein $Z_{ino}$ is the impedance looking into the transmitting coil while switch is closed.

By way of example only, for a two percent (2%) change in the impedance ($Z_{in}$) looking into the transmitting coil, capacitor Cp may be equal to fifty times the values of capacitor C1 (i.e., Cp=50*C1).

Figure 8A:
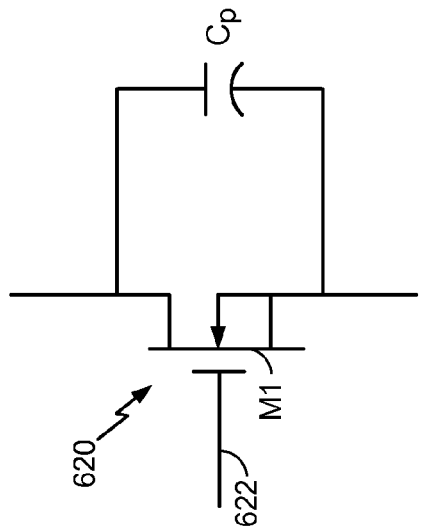
FIG. 8A is an illustration of an implementation of the wireless power system of FIG. 7, according to an exemplary embodiment of the present invention.
Figure 8C:
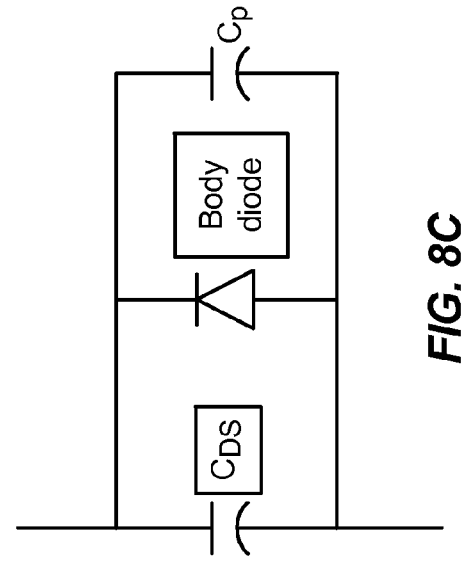
FIG. 8C is an illustration of the implementation of the wireless power system of FIG. 8A in another configuration, according to an exemplary embodiment of the present invention.
Figure 8B:
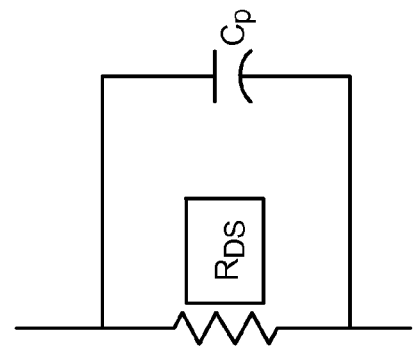
FIG. 8B is an illustration of the implementation of the wireless power system of FIG. 8A in one configuration, according to an exemplary embodiment of the present invention.

FIG. 8A illustrates a contemplated, particular implementation of switch 620, according to an exemplary embodiment of the present invention. As illustrated, switch 620 (see FIGS. 7 and 8A) may comprise a transistor M1 having a drain coupled to one side of reactive element Cp, a source coupled to another side of reactive element Cp, a gate coupled to a control signal 622. FIG. 8B illustrates a partial circuit representation of transmitting coil 612 while switch 620 is in a closed configuration wherein a resistance $R_{DS}$ is the drain-to-source resistance of transistor M1. FIG. 8C illustrates a partial circuit representation of transmitting coil 612 while switch 620 is in an open configuration illustrating a body diode and a capacitance $C_{DS}$, which is the drain-to-source capacitance of transistor M1. Assuming, for example only, with a peak voltage of switch 620 (i.e., the transistor) at 0.7 volts, and with switch 620 open, the following equations are given:

$$V_{C_p} = V_{FET} = 0.7V_{peak} = 0.5V_{rms}; \quad (5)$$

$$I_{IN} = V_{C_p}/X_{C_p} = 0.059 \ A_{rms}; \quad (6)$$

$$P_{load} = I_{IN} * I_{IN} * Z_{IN} = 0.059 \ W_{rms}; \quad (7)$$

As will be appreciated by a person having ordinary skill in the art, a body diode of transistor may conduct at higher power and, therefore, reactive element Cp may be shorted out. Accordingly, a single transistor (i.e., a single FET) may, depending on component variables, be limited to lower power (e.g., 0.0625 W). This may be insufficient for systems requiring higher power.

Figure 9C:
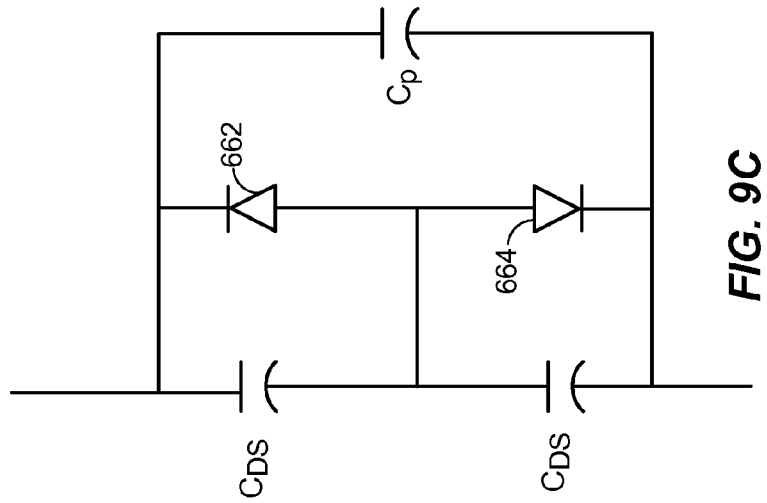
FIG. 9C is an illustration of the implementation of the wireless power system of FIG. 9A in another configuration, according to an exemplary embodiment of the present invention.
Figure 9A:
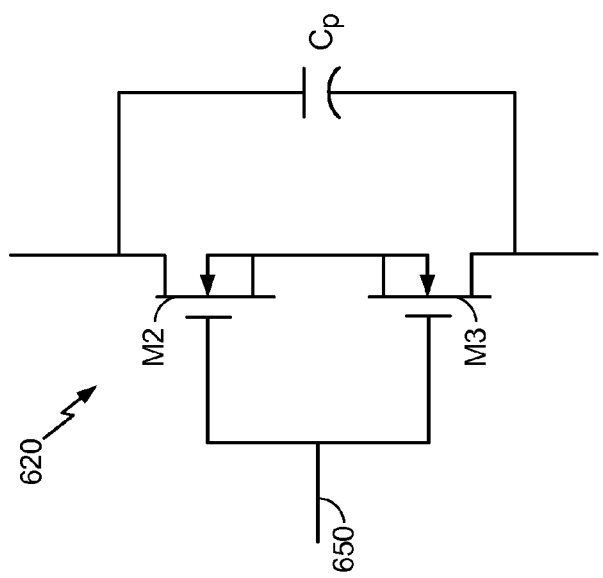
FIG. 9A is an illustration of another implementation of the wireless power system of FIG. 7, according to an exemplary embodiment of the present invention.
Figure 9B:
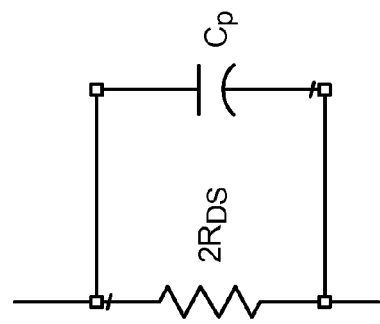
FIG. 9B is an illustration of the implementation of the wireless power system of FIG. 9A in one configuration, according to an exemplary embodiment of the present invention.

FIG. 9A illustrates another contemplated, particular implementation of switch 620, according to an exemplary embodiment of the present invention. As illustrated, switch 620 may comprise a plurality of transistors (e.g., FETs). More specifically, switch 620 may comprise a first transistor M2 having a drain coupled to one side of reactive element Cp and a source coupled to a source of a second transistor M3. Furthermore, second transistor M3 has a drain coupled to another side of reactive element Cp. Each of first transistor M2 and second transistor M3 has a gate coupled to a control signal 650. FIG. 9B illustrates a partial circuit representation of transmitting coil 612 while switch 620 is in a closed configuration (i.e., transistors M2 and M3 are both closed) wherein a resistance $2R_{DS}$ is the drain-to-source resistance of transistor M2 combined with the drain-to-source resistance of transistor M3. FIG. 9C illustrates a partial circuit representation of transmitting coil 612 while switch 620 is in an open configuration (i.e., transistors M2 and M3 are both open). The circuit representation of FIG. 9C includes body diodes 662 and 664, one for each transistor M2 and M3, and two drain-to-source capacitances $C_{DS}$, one for each transistor M2 and M3. Again, assuming $V_{C_{DS}} = 0.7V_{peak} = 0.5V_{rms}$:

$$V_{C_p} = 2 * V_{C_{DS}} = 1.0V_{rms}; \quad (8)$$

$$I_{IN} = I_{C_p} = V_{C_p}/X_{C_p} = 0.118 \ A; \quad (9)$$

$$P_{load} = I_{IN} * I_{IN} * Z_{IN} = 0.237 \ W_{rms}; \quad (10)$$

As will be appreciated by a person having ordinary skill in the art, voltage peaks may still cause a body diode of the transistors to conduct, however, only capacitance $C_{DS}$ may be shorted out, rather than reactive element Cp.

Figure 10:
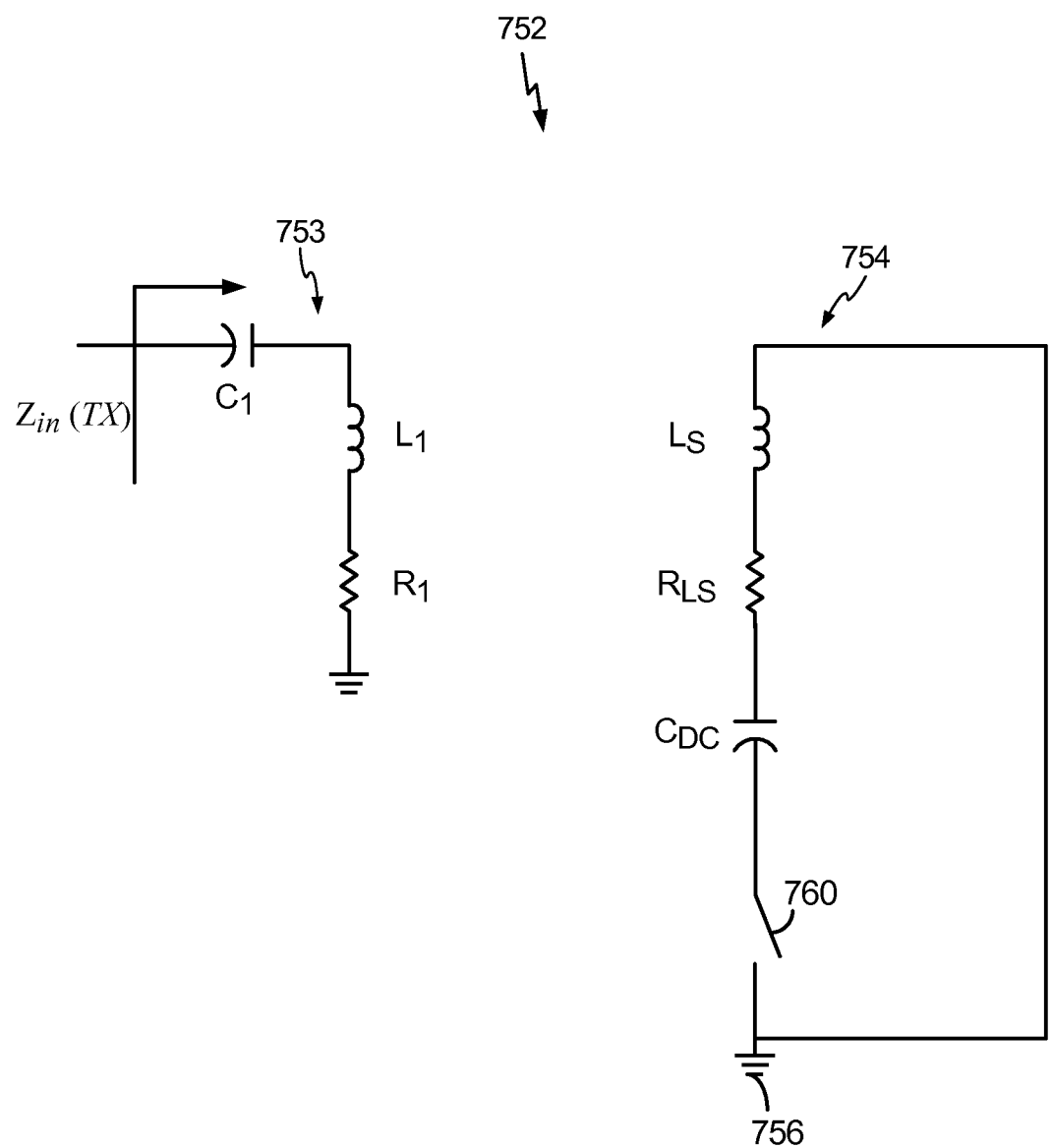
FIG. 10 is a circuit diagram of a transmitter, in accordance with an exemplary embodiment of the present invention.

FIG. 10 illustrates a circuit diagram of a transmitter 752 including a transmitting coil 753 and a parasitic coil 754, according to another exemplary embodiment of the present invention. It is noted parasitic coil 754 may be positioned in any suitable location of a wireless power charger (e.g., at the edge of a charging pad). Transmitting coil 753 includes inductor L1 and resistor R1, and may be tuned by capacitor C1. Parasitic coil 754 includes an inductor $L_S$, a resistor $R_{LS}$, a capacitor $C_{DC}$ and a switch 760 coupled between capacitor $C_{DC}$ and a ground voltage 756. By way of example only, capacitor $C_{DC}$ may comprise a capacitance of 100 nF, inductor $L_S$ may have an inductance of 0.4 µH, and resistor $R_{LS}$ may have a resistance equal to or less than 0.2 ohms. Switch 760 may comprise one or more transistors. For example, with reference to FIG. 11A, switch 760 comprises a transistor M4. FIG. 11B illustrates a circuit representation of parasitic coil 754 wherein switch 760 is in a closed configuration. As illustrated in FIG. 11B, switch 760 includes a capacitance $C_{DS}$ and a resistance $R_{DS}$. FIG. 11C illustrates a circuit representation of parasitic coil 754 wherein switch 760 is in an open configuration. As illustrated in FIG. 11C, switch 760 includes capacitance $C_{DS}$ and a body diode.

While switch 760 is closed, the self-inductance on transmitting coil 753 may be reduced and the impedance looking into the transmitting coil ($Z_{in}$ (TX)) may be given by the following equation:

$$Z_{in}(TX) = R1 + (M_Sw_0)^2/(jw_0L_S + R_{LS} + R_{S_1}); \quad (11)$$

wherein $M_S$ is the mutual inductance between transmitting coil 753 and parasitic coil 754 and $R_{S_1}$ is the resistance of switch 720.

Moreover, while switch 760 is open, the impedance looking into the transmitting coil ($Z_{in}$(TX)) may be given by the following equation:

$$Z_{in}(TX) = R1 + (M_Sw_0)^2/(jw_0L_S + R_{LS} + X_{C_{DS}}); \quad (12)$$

It is noted that a wireless power system having parasitic coil 754 may be initially tuned with switch 760 in a closed configuration. Thereafter, as devices (e.g., mobile telephones) are added to a charging region of transmitter 752, switch 760 may be opened to increase the self-inductance of transmitter 752.

Moreover, according to another exemplary embodiment of the present invention, one or more reactive elements (e.g., capacitors) may be switched onto or into parasitic coil 754 in order cause parasitic coil to self-resonate. Reactive elements may be switched onto or into parasitic coil 754 in a manner similar to how reactive elements are switched onto transmitting coil 612, as described above with reference to FIGS. 7-8C. It is noted that a wireless power transmitter may include a transmitting coil that is configured to have at least one reactive element switched thereon, a parasitic coil for inductively coupling with a transmitting coil, a parasitic coil for inductively coupling with a transmitting coil and configured to have at least one reactive element switched thereon, or a combination thereof.

According to another exemplary embodiment of the present invention, a resonant condition of a wireless power system, including a wireless power transmitter and one or more wireless power receivers, may be sensed. More specifically, prior to positioning any devices within a charging region of a wireless power transmitter and while a reactance of the wireless power system is zero, a current at a power amplifier may be sensed to determine an optimal, baseline current level. Thereafter, while one or more devices are positioned within a charging region of the wireless power transmitter, but prior to the devices drawing power, the current at the power amplifier may be sensed. Thereafter, the resonant frequency of the transmitter may be adjusted according to or more of the exemplary embodiment described above with reference to FIGS. 7-11 to adjust the measured current to resemble the baseline current and, therefore, cause the reactance of the wireless power system to get as close as possible to zero.

Figure 12:
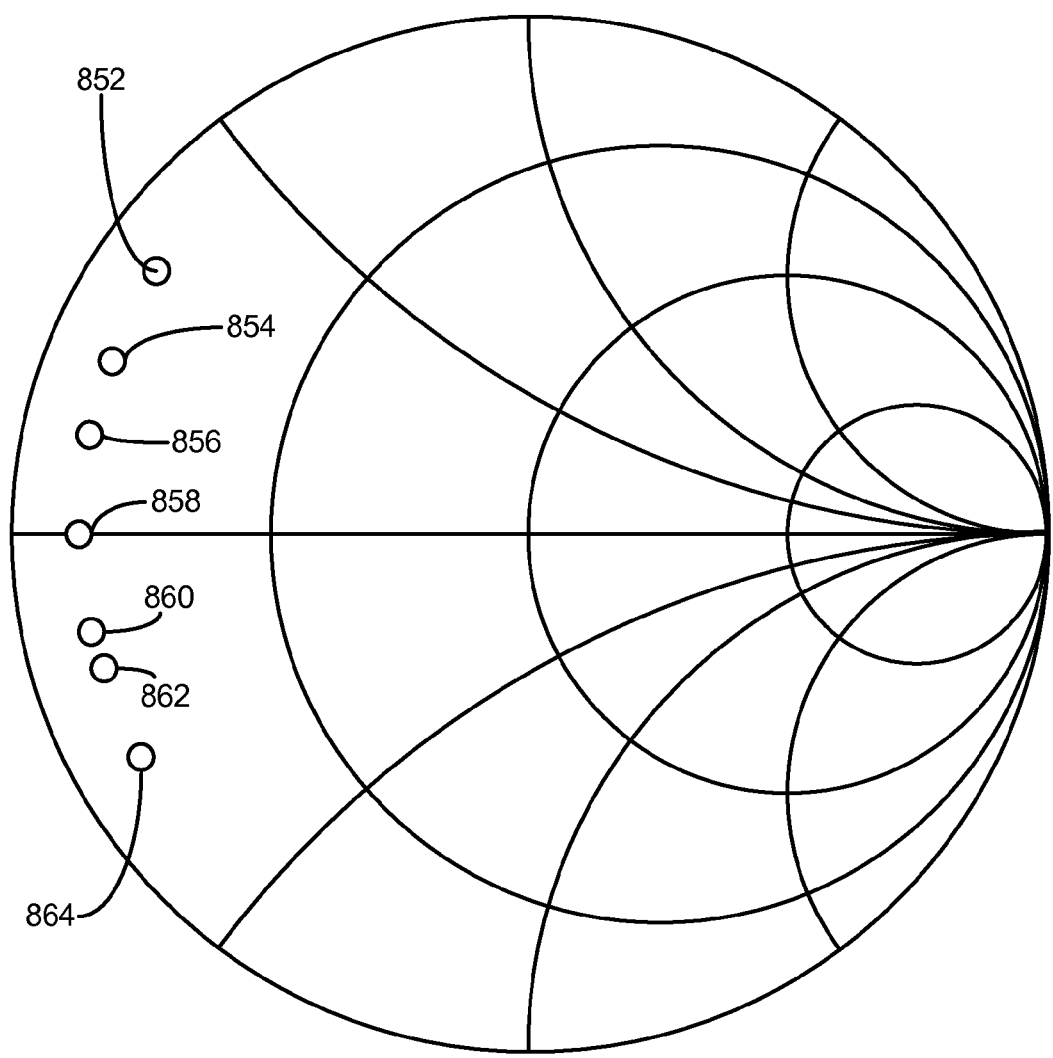
FIG. 12 is a Smith Chart illustrating shifts in reactance of a wireless power transmitter according to variations of the number and positions of mobile telephones placed within a charging region of the wireless power transmitter.

For example, FIG. 12 is a Smith Chart 850 illustrating shifts in reactance of a wireless power transmitter according to variations of the number and positions of mobile telephones placed within a charging region of the wireless power transmitter. A data point 852 illustrates a reactance of the wireless power transmitter that does not have a mobile telephone positioned within an associated charging region. In this example, the reactance value is +j16. A data point 854 illustrates a reactance of the wireless power transmitter having one mobile telephone positioned proximate a middle of an associated charging region. In this example, the reactance value is +j10. A data point 856 illustrates a reactance of the wireless power transmitter having one mobile telephone positioned proximate an edge of an associated charging region. In this example, the reactance value is +j5.5. A data point 858 illustrates a reactance of the wireless power transmitter having two mobile telephones positioned proximate a middle of an associated charging region. In this example, the reactance value is zero. A data point 860 illustrates a reactance of the wireless power transmitter having two mobile telephones positioned proximate an edge of an associated charging region. In this example, the reactance value is -j6. A data point 862 illustrates a reactance of the wireless power transmitter having three mobile telephones positioned proximate a middle of an associated charging region. In this example, the reactance value is -j8. A data point 864 illustrates a reactance of the wireless power transmitter having three mobile telephones positioned proximate an edge of an associated charging region. In this example, the reactance value is -j14. Accordingly, for this example, the reactance value ranges from approximately +j16 to -j15.

Figure 13:
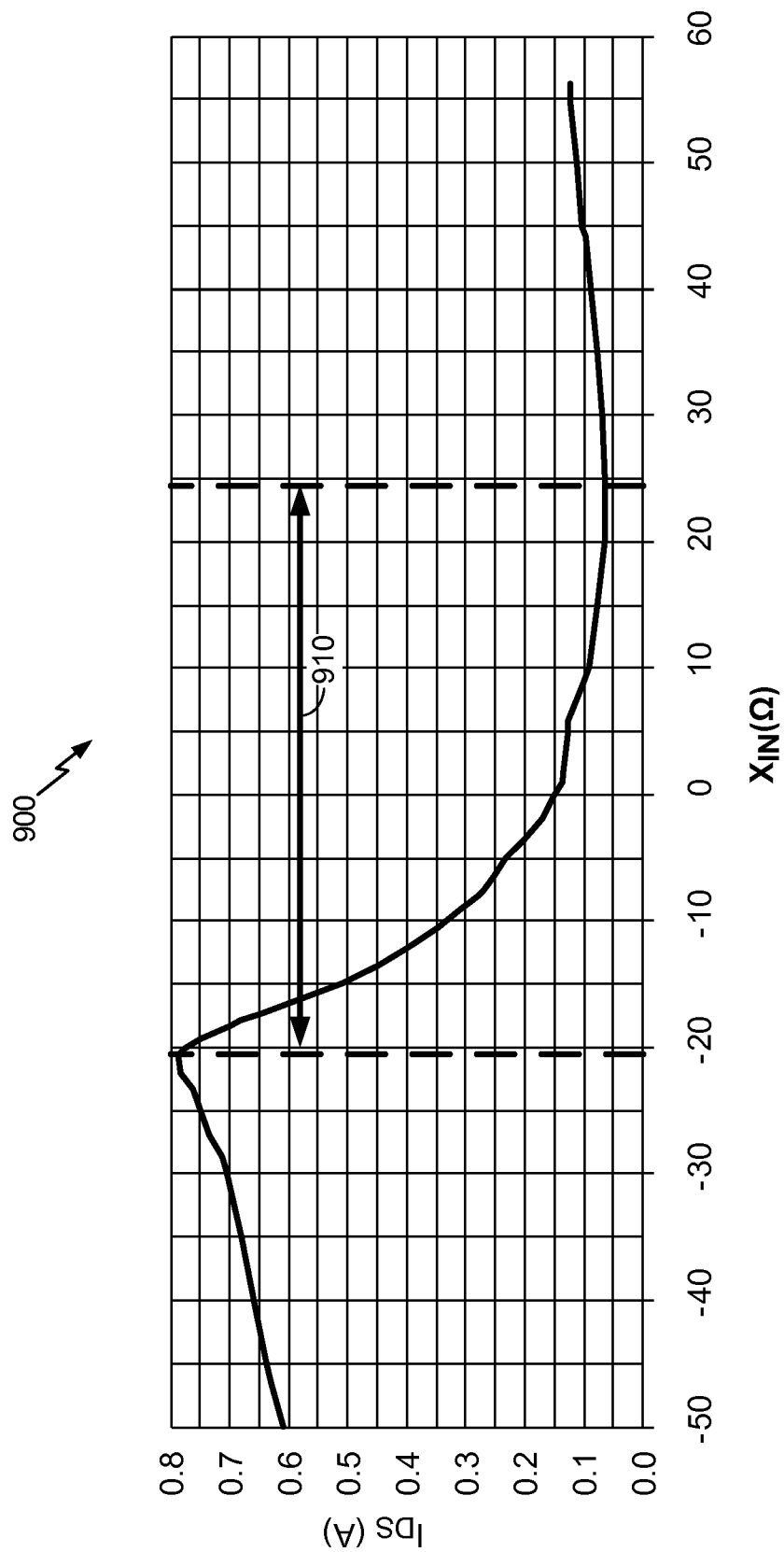
FIG. 13 is a plot illustrating a current level at a power amplifier of a wireless power transmitter relative to a reactance of the wireless power transmitter.

FIG. 13 is a plot 900 illustrating a current level at a power amplifier (e.g., power amplifier 210 of FIG. 4) of a wireless power transmitter relative to a reactance of the wireless power transmitter. It is noted that plot 900 depicts the current level of the power amplifier for variations of the number and positions of mobile telephones illustrated in FIG. 12. As illustrated in plot 900, the current level is monotonic across a range 910 of reactance from -j20 to +j25.

Accordingly, with specific reference to plot 900, as an example, if a baseline current, as described above is measured to be 0.15 amps, and a current, which is sensed while one or more devices are positioned within a charging region of the wireless power transmitter, but prior to the devices drawing power, is higher than the baseline current (e.g., 0.15 amps in this example), it may determined that the reactance is less than zero. Accordingly, the reactance may be adjusted to according to one or more of the embodiments described above with reference to FIGS. 7-11 to decrease the measured current and, thus, cause the reactance to be closer to zero. On the other hand, if a current, which is sensed while one or more devices are positioned within a charging region of the wireless power transmitter, but prior to the devices drawing power, is less than the baseline current (e.g., 0.15 amps in this example), it may determined that the reactance is greater than zero. Accordingly, the reactance may be adjusted to according to one or more of the embodiments described above with reference to FIGS. 7-11 to increase the measured current and, thus, cause the reactance to be closer to zero.

It is noted that this range of reactance at which the current is monotonic may be dependent on the value of the inductors and resistors of the one or more coils within a transmitter and the mutual inductance between the coils within the transmitter. Further, the range of reactance may be dependent on a matching circuit of the power amplifier of the transmitter. It is further noted that a real part (i.e., a loss) may not substantially change when one or more switching elements (i.e., switches 620 and 760) are used to shift an imaginary part and, thus, the switching elements may not add much to the inherent transmitting coil loss.

Figure 14:
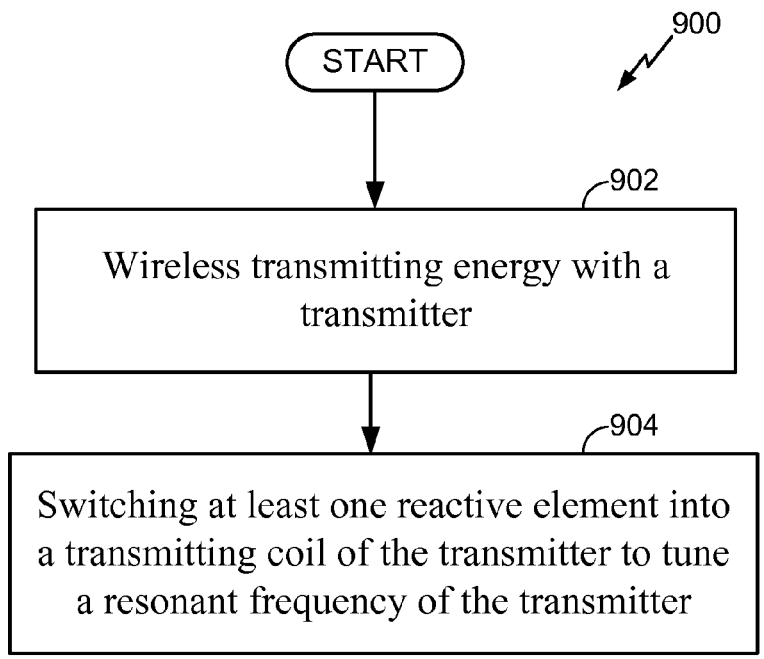
FIG. 14 is a flowchart illustrating a method, in accordance with an exemplary embodiment of the present invention.

FIG. 14 is a flowchart illustrating another method 900, in accordance with one or more exemplary embodiments. Method 900 may include wireless transmitting energy with a transmitter (depicted by numeral 902). Method 900 may further include switching at least one reactive element onto a transmitting coil of the transmitter to tune a resonant frequency of the transmitter (depicted by numeral 904).

Figure 15:
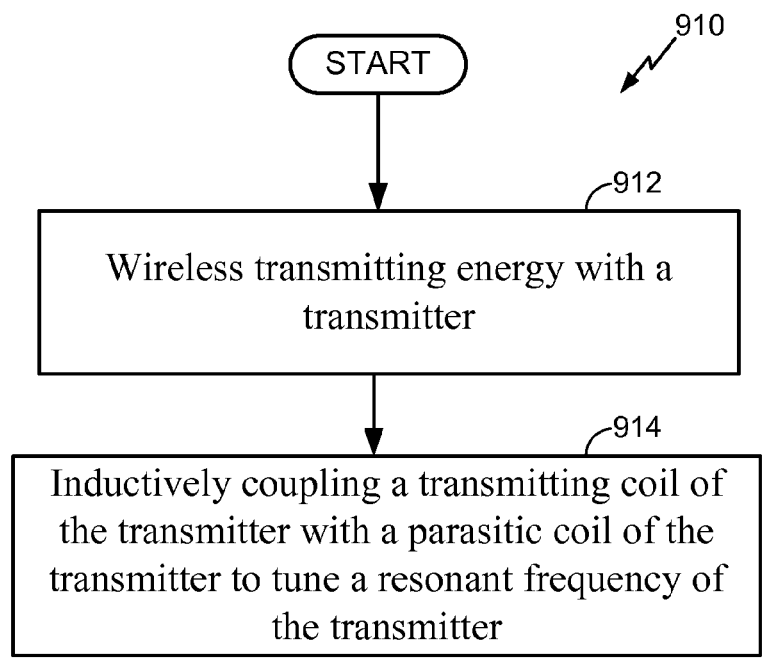
FIG. 15 is a flowchart illustrating another method, in accordance with an exemplary embodiment of the present invention.

FIG. 15 is a flowchart illustrating another method 910, in accordance with one or more exemplary embodiments. Method 910 may include wireless transmitting energy with a transmitter (depicted by numeral 912). Method 910 may further include inductively coupling a transmitting coil of the transmitter with a parasitic coil of the transmitter to tune a resonant frequency of the transmitter (depicted by numeral 914).

Figure 16:
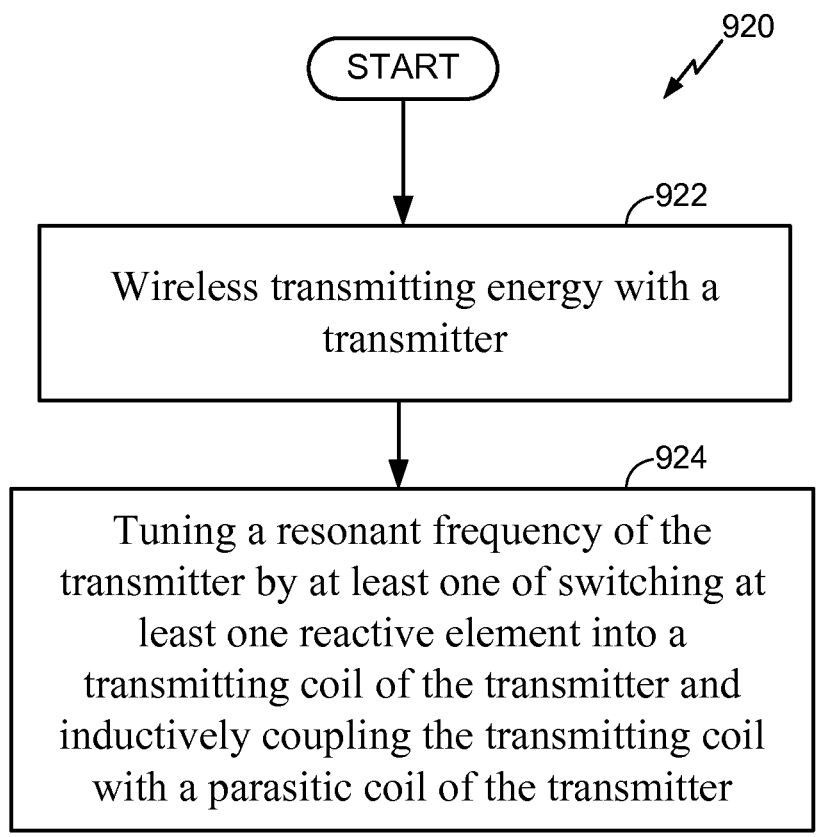
FIG. 16 is a flowchart illustrating yet another method, in accordance with an exemplary embodiment of the present invention.

FIG. 16 is a flowchart illustrating another method 920, in accordance with one or more exemplary embodiments. Method 920 may include wireless transmitting energy with a transmitter (depicted by numeral 922). Method 920 may further include tuning a resonant frequency of the transmitter by at least one of switching at least one reactive element into a transmitting coil of the transmitter and inductively coupling the transmitting coil with a parasitic coil of the transmitter (depicted by numeral 924).

It is noted that a battery, according to the various exemplary embodiments described herein, may have internal wireless charging capability, eliminating the need for battery model specific physical electrical connections at a public charging station. Further, an electronic device, as described herein, may have a second battery embedded therein for continued use of the electronic device while the removable battery is being charged. Moreover, a user of the electronic device may have a spare removable battery for use while the first battery is being charged. Alternately the user may keep the device in a powered-off state with him for safekeeping while the lower value battery is being charged.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transmitter for transmitting power wirelessly to at least one receiver, comprising:
   a resonant circuit comprising a transmit coil electrically coupled to a capacitor, the resonant circuit configured to resonate at a resonant frequency, the transmit coil configured to transmit wireless power at a level sufficient to charge a battery of the at least one receiver;
   a parasitic coil within a coupling distance from the transmit coil and comprising a switching element and at least one reactive element coupled to the switching element, the parasitic coil configured to inductively couple to the transmit coil and positioned at a location suitable for adjusting the resonant frequency of the resonant circuit; and
   a controller configured to selectively cause the parasitic coil to adjust the resonant frequency of the resonant circuit to a desired frequency by varying the at least one reactive element of the parasitic coil, wherein adjusting the resonant frequency of the resonant circuit is made in response to positioning of the at least one receiver within a charging region of the resonant circuit.

2. The transmitter of claim 1, wherein the reactive element comprises a capacitor.

3. The transmitter of claim 1, wherein the switching element is coupled in series with the reactive element.

4. The transmitter of claim 1, wherein the switching element comprises a plurality of transistors coupled in series, the plurality of transistors coupled in parallel with the at least one reactive element.

5. The transmitter of claim 1, wherein the parasitic coil comprises an inductor and a resistance and is configured to be tuned by the reactive element comprising a capacitor, the switching element coupled between the capacitor and a ground voltage.

6. The transmitter of claim 5, wherein the inductor, the parasitic resistor, the capacitor, and the switching element are in series with each other.

7. The transmitter of claim 6, wherein the switching element comprises a transistor, and wherein a drain of the transistor is coupled to the capacitor.

8. The transmitter of claim 6, wherein the parasitic coil is electrically connected to a second capacitor in parallel with a second resistor when the switching element is closed.

9. The transmitter of claim 6, wherein the parasitic coil is electrically connected to a second capacitor in parallel with a body diode when the switching element is open.

10. The transmitter of claim 1, wherein the reactive element is configured to cause the parasitic coil to self resonate.

11. The transmitter of claim 1, wherein the at least one receiver comprises a first receiver, wherein the load sensing circuit is further configured to sense a third value of the current in response to detecting a second receiver within the charging region when the first receiver is still positioned within the charging region, and wherein the switching circuit is configured to switch the reactive element into or out of the parasitic coil based on comparing the third value with the first value.

12. The transmitter of claim 11, wherein the switching circuit is configured to switch the reactive element into the parasitic coil to reduce a reactance of the transmitter in response to the second receiver being positioned within the charging region.

13. The transmitter of claim 1, wherein the at least one receiver comprises multiple active receivers, wherein the load sensing circuit is further configured to detect the presence and absence of the multiple active receivers in the charging region of the transmitter, and wherein the power amplifier is further configured to draw the current based on the number of detected active receivers in the charging region.

14. The transmitter of claim 1, wherein the transmit coil and the parasitic coil are located within a near-field of the transmitter.

15. The transmitter of claim 1, wherein the transmit coil and the parasitic coil are located within the charging region of the transmitter.

16. The transmitter of claim 1, wherein the transmit coil and the parasitic coil are embedded in a charging mat or surface.

17. The transmitter of claim 1, wherein the transmit coil and the parasitic coil have a predetermined mutual inductance therebetween.

18. A method for transmitting power wirelessly to at least one receiver, comprising:
    transmitting power wirelessly with a resonant circuit at a level sufficient to charge a battery of the at least one receiver, the resonant circuit comprising a transmitting coil and a capacitor;
    inductively coupling the transmitting coil to a parasitic coil within a coupling distance from the transmitting coil and comprising a switching element and at least one reactive element coupled to the switching element, the parasitic coil positioned at a location suitable for adjusting a resonant frequency of the resonant circuit;
    selectively adjusting, by the parasitic coil, the resonant frequency of the resonant circuit to a desired frequency by varying the at least one reactive element of the parasitic coil, wherein adjusting the resonant frequency of the resonant circuit is made in response to positioning of the at least one receiver within a charging region of the resonant circuit.

19. The method of claim 18, wherein switching the reactive element into the parasitic coil comprises opening a plurality of transistors in parallel with the at least one reactive element.

20. The method of claim 18, wherein the parasitic coil comprises a resistor coupled in series with a capacitor, an inductor, and the switching element.

21. The method of claim 20, wherein the parasitic coil is electrically connected to a second capacitor in parallel with a second resistor when the switching element is closed.

22. The method of claim 20, wherein the parasitic coil is electrically connected to a second capacitor in parallel with a body diode when the switching element is open.

23. The method of claim 18, further comprising closing the switching element configured to reduce a self-inductance of the transmitting coil.

24. The method of claim 18, wherein switching the reactive element comprises opening the switching element configured to cause the parasitic coil to resonate.

25. The method of claim 18, wherein the transmitting coil and the parasitic coil are located within a near-field of the transmitter.

26. The method of claim 18, wherein the transmitting coil and the parasitic coil are located within the charging region of the transmitter.

27. A device for transmitting power wirelessly to at least one receiver, comprising:
    means for wirelessly transmitting power at a level sufficient to charge a battery of the at least one receiver, the means for wirelessly transmitting comprising a capacitor;
    means for inductively coupling inductively coupled to the means for wirelessly transmitting, the means for inductively coupling within a coupling distance from the means for wirelessly transmitting, the means for inductively coupling comprising means for switching at least one reactive element into or out of the means for inductively coupling, the means for inductively coupling positioned at a location suitable for adjusting a resonant frequency of the means for wirelessly transmitting; and
    means for selectively adjusting the resonant frequency of the means for wirelessly transmitting to a desired frequency by varying the at least one reactive element of the means for inductively coupling, wherein adjusting the resonant frequency of the means for wirelessly transmitting is made in response to positioning of the at least one receiver within a charging region of the means for wirelessly transmitting.

28. The device of claim 27, wherein the means for switching switches the reactive element into a loop in the means for inductively coupling by opening a plurality of transistors in parallel with the reactive element.

29. The device of claim 27, wherein the means for inductively coupling comprises a resistor coupled in series with a capacitor and an inductor, and wherein the means for switching is coupled in series with the resistor, the capacitor, and the inductor.

30. The device of claim 29, wherein the means for inductively coupling is electrically connected to a second capacitor in parallel with a second resistor when the switching element is closed.

31. A transmitter for transmitting power wirelessly to at least one receiver, comprising:
- a resonant circuit comprising a transmit coil electrically coupled to a capacitor, the resonant circuit configured to resonate at a resonant frequency, the transmit coil configured to wirelessly transmit power at a level sufficient to charge a battery of the at least one receiver;
- a parasitic coil within a coupling distance from the transmit coil and comprising a switching element and at least one reactive element, the parasitic coil configured to inductively couple to the resonant circuit comprising the transmit coil and positioned at a location suitable for adjusting the resonant frequency of the resonant circuit; and
- a controller configured to selectively cause the parasitic coil to adjust the resonant frequency of the resonant circuit to a desired frequency by varying the at least one reactive element of the parasitic coil wherein adjusting the resonant frequency of the resonant circuit is made in response to positioning of the at least one receiver within a charging region of the resonant circuit.

32. A transmitter for transmitting power wirelessly to at least one receiver, comprising:
- a resonant circuit comprising a transmit coil electrically coupled to a capacitor, the resonant circuit configured to resonate at a resonant frequency, the transmit coil configured to transmit wireless power at a level sufficient to charge a battery of the at least one receiver;
- a load sensing circuit configured to i) sense a first value of an current before the at least one receiver is within a charging region of the transmitter and ii) sense a second value of the current while the at least one receiver is within the charging region of the transmitter;
- a parasitic coil within a charging distance from the transmit coil and comprising at least one reactive element, the parasitic coil configured to inductively couple to the transmit coil and positioned at a location suitable for adjusting the resonant frequency of the resonant circuit; and
- a controller configured to selectively cause the parasitic coil to adjust the resonant frequency of the resonant circuit to a desired frequency by varying the at least one reactive element of the parasitic coil, wherein adjusting the resonant frequency of the resonant circuit is made in response to positioning of the at least one receiver within a charging region of the resonant circuit and a change between the first value and the second value sensed by the sensing circuit.

33. A transmitter apparatus for wirelessly transmitting power to at least one receiver, comprising:
- a resonant circuit comprising a transmit coil electrically coupled to a capacitor, the resonant circuit configured to resonate at a resonant frequency, the transmit coil configured to generate a wireless field to wirelessly transfer power to at least one receiver at a level sufficient to charge a battery of the at least one receiver within a charging region of the transmitter apparatus;
- a load sensing circuit configured to i) sense a first value of a current before the at least one receiver is within a charging region of the transmitter apparatus and ii) sense a second value of the current while the at least one receiver is within the charging region of the transmitter apparatus;
- an amplifier configured to draw the current from a power source, the load sensing circuit operably connected between the amplifier and the power source;
- a parasitic coil located within the charging region and comprising a switching element and at least one reactive element coupled to the switching element, the parasitic coil configured to inductively couple to the transmit coil and positioned at a location suitable for adjusting the resonant frequency of the resonant circuit; and
- a controller configured to i) compare the first and second values of the current sensed by the load sensing circuit and ii) selectively cause the parasitic coil to adjust the resonant frequency of the resonant circuit to a desired frequency by varying the at least one reactive element of the parasitic coil, wherein adjusting the resonant frequency of the resonant circuit is made in response to positioning of the at least one receiver within the charging region of the resonant circuit and the comparison.

* * * * *